United States Patent [19]

Prue

[11] Patent Number: 4,969,917
[45] Date of Patent: Nov. 13, 1990

[54] ANIMAL TAIL CONTROL DEVICE

[75] Inventor: Louis A. Prue, Newport, Vt.

[73] Assignee: Gaston Poulin, Newport, Vt. ; a part interest

[21] Appl. No.: 351,467

[22] Filed: May 15, 1989

[51] Int. Cl.$^5$ ............................................. A01K 13/00
[52] U.S. Cl. .................................................... 119/105
[58] Field of Search ................. 119/29, 105, 126, 128, 119/111, 112, 96, 114, 110; 24/300, 301, 302; 54/78; 128/DIG. 15, 165, 878

[56] References Cited

U.S. PATENT DOCUMENTS

| | | | |
|---|---|---|---|
| 1,170,369 | 2/1916 | Wagner, Jr. | 119/105 |
| 1,179,590 | 4/1916 | Whitcomb | 119/105 |
| 1,450,774 | 4/1923 | Haering | 119/105 |
| 1,458,821 | 6/1923 | Haering | 119/105 |
| 2,911,947 | 11/1959 | Kramer | 119/96 X |
| 2,994,300 | 8/1961 | Grahling | 119/96 |
| 3,126,860 | 3/1964 | Shepperton | 24/301 X |
| 3,587,570 | 6/1971 | Kilbey | 128/DIG. 15 X |
| 3,797,483 | 3/1974 | Feldman | 128/DIG. 15 X |
| 4,091,766 | 5/1978 | Colliard | 119/106 |
| 4,745,883 | 5/1988 | Baggetta | 119/96 |

FOREIGN PATENT DOCUMENTS

| | | | |
|---|---|---|---|
| 0219219 | 2/1910 | Fed. Rep. of Germany | 128/878 |
| 1190242 | 4/1965 | Fed. Rep. of Germany | 119/105 |
| 1224087 | 9/1966 | Fed. Rep. of Germany | 119/105 |
| 0068543 | 3/1951 | Netherlands | 119/105 |
| 0098964 | 5/1923 | Switzerland | 119/105 |

Primary Examiner—Robert P. Swiatek
Assistant Examiner—Todd E. Manahan
Attorney, Agent, or Firm—George C. Atwell

[57] ABSTRACT

A device permitting movement of a cow's tail while the cow is in its stall and which will maintain the tail elevated when the animal is lying down to avoid tail contact with the animal's droppings. The device includes an elongated elastic cord for extension from a fixed overhead point to an integral tubular sleeve wrapped on the animal's tail near its end to absorb the shock of directional change when the animal swings its tail. The sleeve is adapted to retain its normal position adjacent the tail's distal end and to slip free from its engagement on the tail if the animal breaks free from its stall, thereby avoiding tail injury.

4 Claims, 1 Drawing Sheet

U.S. Patent
Nov. 13, 1990
4,969,917
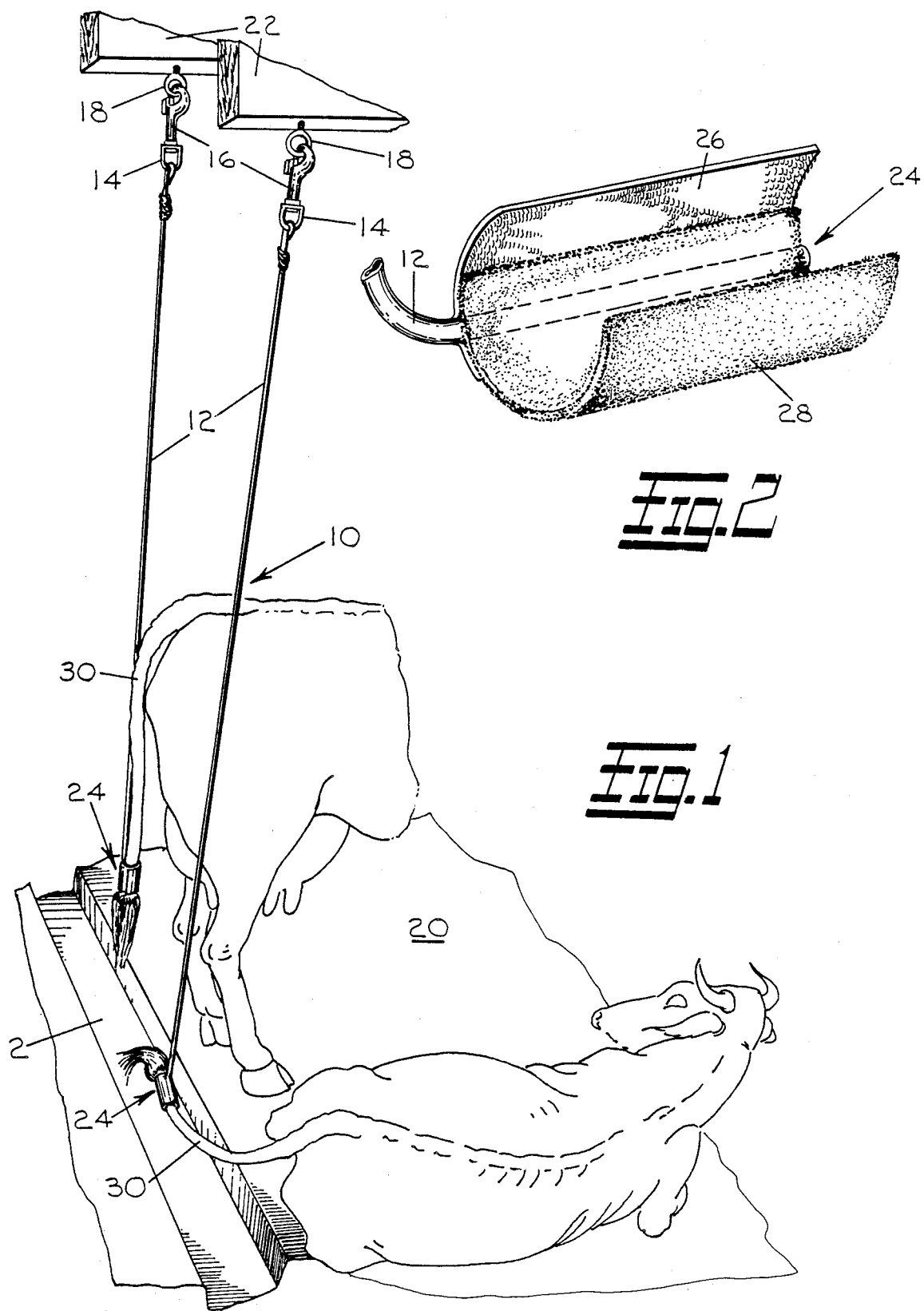

ANIMAL TAIL CONTROL DEVICE

BACKGROUND OF THE INVENTION

1. Field of the Invention

The present invention pertains to dairy cows and more particularly to an improved tail band supporting device for such animals while in their stalls.

2. Description of the Prior Art

It is common practice to provide holders or supports for cows' tails to maintain the latter elevated when the animals are lying down as well as to avoid uncontrolled swinging of the tails during the milking procedure.

The known forms of cow tail supports are fabricated from flexible cord or rope and although they serve their intended purpose, they do not provide a means for preventing the shock of direction change of tail movement when reaching the limit of movement which such supports control.

The teachings of U.S. Pat. No. 1,450,774 issued to Joseph Haering is believed to be the closest reference. However, it differs from the present invention in that the coil spring interposed in the supporting cord or rope adds considerable weight to the latter and is intended to yieldably resist the switching of a cow's tail as well as a means of quick release of said tail from the cord or rope.

The present invention is of lightweight material, permits greater freedom of movement of the animal's tail and possesses shock absoring qualities along the entire length thereof.

SUMMARY OF THE INVENTION

The tail control device according to the invention includes stretchable cord possessing elasticity that continually urges it to the position of its free length. One end of the cord attaches to a swivel positioned above the stall and the opposite end has a band element fixed thereon. The band element is adapted to be attached adjacent to the lower end of the animal's and maintains the latter elevated when said animal is lying down.

It is a general object of the invention to provide a control device for supporting a cow's tail while it is in its stall. A further object is to provide a control device for supporting a cow's tail to prevent the latter from making contact with accumulations on the floor of the stall as well as the gutter at the rear of said stall.

A further and more specific object of the invention is to provide a control device for supporting a cow's tail having shock absorbing qualities along its entire length that will prevent injury to the animal's tail by absorbing the shock of direction change when said animal swings its tail first in one direction and then another.

These and other objects of the invention will become more fully apparent by reference to the appended claims and as the following detailed description proceeds in reference to the figures of drawing wherein:

BRIEF DESCRIPTION OF THE DRAWING

FIG. 1 is a perspective view showing a tail band control device according to the invention and its attachment to animals in both the standing and lying down positions; and FIG. 2 is a perspective view of a band element component attachment to the animal's tail.

DETAILED DESCRIPTION OF THE PREFERRED EMBODIMENT

Referring now to the various figures of the accompanying drawing, the control device according to the invention is identified generally by numeral 10 and includes among its various parts a stretchable cord 12 of elastic material which is referred to hereafter as Bungee cord.

This Bungee cord possesses elasticity that continually urges it to the position of its free length thereby featuring shock absorbing qualities along its entire length. One end of the Bungee cord is attached to a swivel 14 that forms one end of the spring hook 16. This spring hood 16 attaches to a screw eye 18 that is fixed above the animal's stall 20 to any suitable member such as to a beam 22.

The Bungee cord 12 depends from the swivel 14 and the lower end thereof is fixed to a band member or flexible sleeve identified generally by numeral 24 the lower end of the cord 12 extending longitudinally through the band member 24. This band member 24 preferably has a releasable pressure-actuated fastening means which may take the form of mating strips of the plastic hook and loop type sold under the tradename VELCRO. A strip of hook material 26 is fixed to one edge of a band of mating loop material 28. The material 26 is engageable with the outer surface of the mating material 28 when the band member 24 is attached to the animal's tail 30 as shown in FIG. 1.

The band member or sleeve identified generally by numeral 24 is positioned adjacent the tail's distal end and being elongated as shown in FIGS. 1 and 2 is of sufficient length so as to cover a plurality of vertebrae which form said tail. The band member covers a comparatively long area of the tail thereby avoiding the application of pressure at a particular point when the animal changes the direction of swing of its tail. The provision of an elongated band member distributes the area of force whereby the possibility of injury or the actual breaking of a tail at a vertebra joint is substantially reduced.

The Bungee cord 12 extends from that end of the band member adjacent the end of the animal's tail and provides a means of quick release of the tail. More specifically, when the band member shown in FIG. 2 is in its affixed position on the cow's tail and shaped to its sleeve configuration as shown in FIG. 1, the second end of cord 12 extends longitudinally through the sleeve sidewall. Should the animal break loose from its stall, the direction of pulling force applied by movement of the animal would be on a line parallel to the axis of its tail thus causing the band member to slide over the end of the tail. The band member is wrapped about the tail sufficiently to maintain its normal position but loosely enough to slip free of the tail or cause a separation of the materials 26 and 28 along a longitudinal parting line to free the animal when a direct pulling force is applied thereto.

The Bungee cord 12 provides greater freedom of movement of the animal's tail 30 and serves to absorb the shock of direction change as the animal swings its tail first in one direction and then another. As shown in FIG. 1, the tail control device 10 is effective in preventing the animal's tail from contacting the floor of the stall 20 or the gutter 32 when the animal is lying down.

Although the present invention has been described in connection with a preferred embodiment it is to be understood that modifications and variations may be resorted to without deparating from the spirit and scope of the invention as those skilled in the art will readily understand. Such modifications and variations are considered to be within the purview and scope of the invention and the appended claims.

I claim:

1. A tail control device, for supporting a cow's tail while in its stall, comprising:

a support means fixedly positioned above the stall;

a spring hook attached to said support means and including a swivel eye formed at one end thereof;

an elastic cord having its first end attached to the swivel eye;

a flexible, elongated, tubular sleeve, for attachment to the cow's tail, connected to a second opposite end of the cord;

the sleeve being separable along a longitudinal sidewall parting line and having releasable fastening means along the parting line to facilitate the sleeve being manually wrapped to a slidable disposition on the cow's tail and manually removed therefrom; and the second end of the cord extending longitudinally from a first end of the tubular sleeve such that, when the sleeve is affixed on the cow's tail with the first end of the sleeve oriented toward the distal end of the tail, a pulling force exerted on the cord and along a line generally parallel to, a longitudinal axis of its sleeve will cause the sleeve to be slidably drawn along and off the distal end of the tail.

2. The device of claim 1 wherein the sleeve is sufficiently elongated to extend over a plurality of vertebrae of the cow's tail.

3. The device of claim 1 or 2 wherein the second end of the cord extends longitudinally through a sidewall of the sleeve.

4. The device of claim 1 wherein the fastening means comprises mating hook and loop strips attached to the sleeve sidewall adjacent respective edges of the parting line to permit variable diameter adjustment of the tubular sleeve.

* * * * *